United States Patent
Weber

(10) Patent No.: US 11,185,166 B2
(45) Date of Patent: Nov. 30, 2021

(54) ACTUATOR FOR SEAT ADJUSTMENT DEVICES

(71) Applicant: Bühler Motor GmbH, Nuremberg (DE)

(72) Inventor: Stefan Weber, Lauf (DE)

(73) Assignee: BÜHLER MOTOR GMBH, Nuremberg (DE)

(*) Notice: Subject to any disclaimer, the term of this patent is extended or adjusted under 35 U.S.C. 154(b) by 126 days.

(21) Appl. No.: 16/823,508

(22) Filed: Mar. 19, 2020

(65) Prior Publication Data

US 2020/0297115 A1    Sep. 24, 2020

(30) Foreign Application Priority Data

Mar. 22, 2019 (DE) .................... 10 2019 203 947.2

(51) Int. Cl.
| | | |
|---|---|---|
| F16D 23/12 | (2006.01) | |
| A47C 7/00 | (2006.01) | |
| F16H 21/44 | (2006.01) | |
| F16C 1/12 | (2006.01) | |
| F16D 11/14 | (2006.01) | |
| F16D 125/62 | (2012.01) | |
| F16D 121/14 | (2012.01) | |

(52) U.S. Cl.
CPC .................. *A47C 7/00* (2013.01); *F16C 1/12* (2013.01); *F16D 11/14* (2013.01); *F16D 23/12* (2013.01); *F16H 21/44* (2013.01); *F16C 2326/08* (2013.01); *F16C 2326/43* (2013.01); *F16D 2023/126* (2013.01); *F16D 2121/14* (2013.01); *F16D 2125/62* (2013.01)

(58) Field of Classification Search
CPC ........ F16C 1/12; F16C 2326/08; F16D 23/12; F16D 2023/126; F16D 2125/62
See application file for complete search history.

(56) References Cited

U.S. PATENT DOCUMENTS

| | | | | |
|---|---|---|---|---|
| 4,892,004 A | * | 1/1990 | Segura | .................... F16D 23/12 |
| | | | | 188/196 B |
| 4,930,605 A | * | 6/1990 | Boyer | .................. B60T 11/046 |
| | | | | 188/106 A |

FOREIGN PATENT DOCUMENTS

EP    1 862 351 A2    12/2007

OTHER PUBLICATIONS

Search Report dated Nov. 26, 2019, issued in counterpart German Patent Application No. 10 2019 203 947.2 (5 pages).

* cited by examiner

*Primary Examiner* — Stacey A Fluhart
(74) *Attorney, Agent, or Firm* — Westerman, Hattori, Daniels & Adrian, LLP

(57) ABSTRACT

An actuating drive, in particular for seat adjustment devices, comprising at least one electric motor, a downstream reduction gear, a coupling device which has a coupling engagement spring that ensures an engaged position of the coupling device during motorized operation and permits a manual disengagement against its coupling force. The coupling device has a coupling lever pivotably mounted in a pivot bearing of a bearing block. The coupling lever is connected at one end of the pivot bearing to a mechanical actuating unit and by which at the other end of the pivot bearing a coupling means can be adjusted to disengage the coupling device. The actuating drive ensures both reliable electrical and reliable manual operation, a high degree of efficiency during electrical operation and simple assembly for a generic actuating drive.

19 Claims, 6 Drawing Sheets

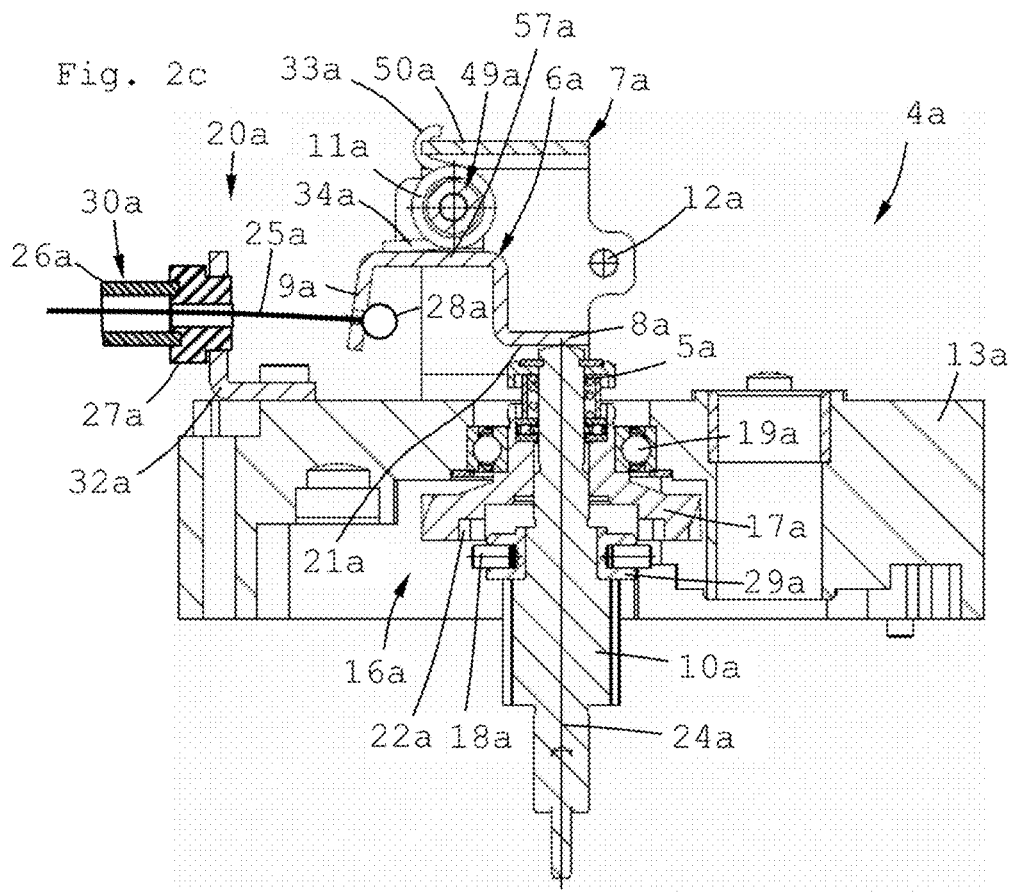
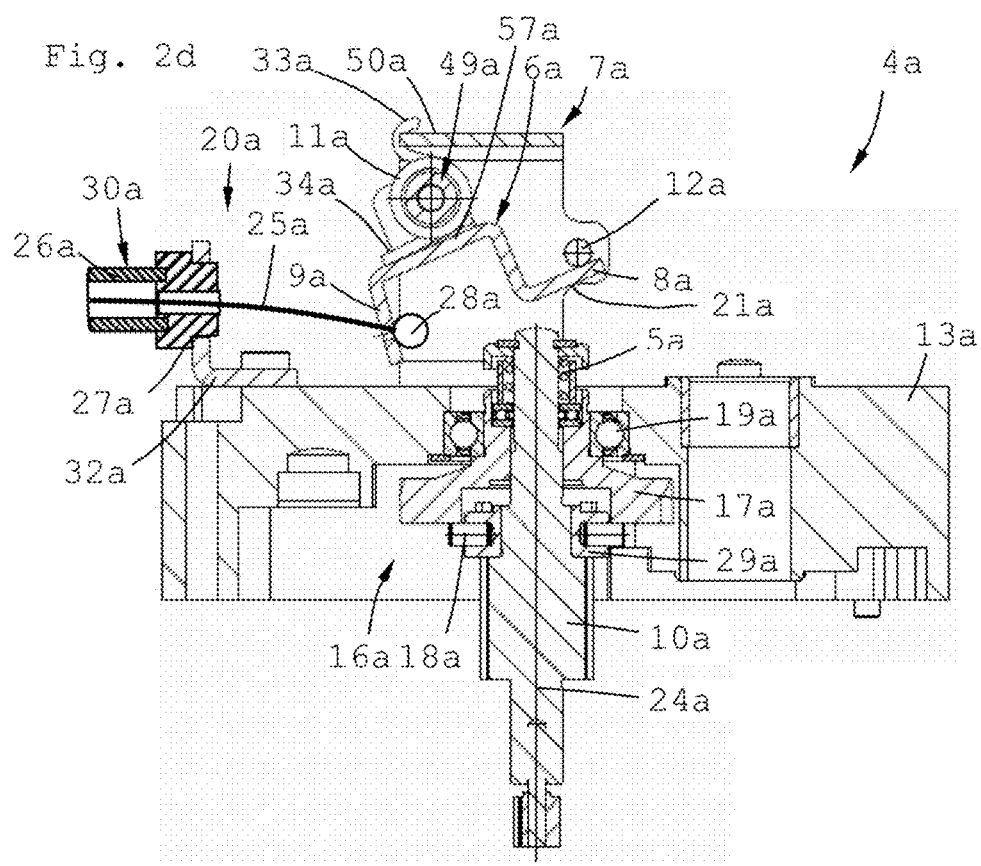

ACTUATOR FOR SEAT ADJUSTMENT DEVICES

CROSS-REFERENCE TO RELATED APPLICATIONS

The present patent application claims priority from, German Application No. DE 10 2019 203 947.2, filed on Mar. 22, 2019, and which is incorporated herein by reference in its entirety.

BACKGROUND OF THE INVENTION

(1) Field of the Invention

The invention relates to an actuating drive, in particular for seat adjustment devices, comprising at least one electric motor, a downstream reduction gear, a coupling device which has a coupling engagement spring which ensures an engaged position of the coupling device during motorized operation and permits a manual disengagement against its coupling force, wherein the coupling device has a coupling lever pivotably mounted in a pivot bearing of a bearing block. The coupling lever is connected on one side of the pivot bearing to a mechanical actuating unit and by which on the other side of the pivot bearing a coupling means can be adjusted to disengage the coupling device.

(2) Description of Related Art Including Information Disclosed Under 37 CFR 1.97 and 1.98

Actuating drives, in particular for seat adjustment devices, increase the comfort of a seat user. In the event of a power failure or other defect, an adjustment of the seat would no longer be possible, in particular when self-locking mechanisms are used. In the case of aircraft seats, it is prescribed for safety reasons that the seat must be manually adjustable even in the event of failure of the power supply, and for this reason coupling devices are regularly provided which enable an interruption of the flow of force from the actuating drive to a seat actuator. The actuating drives are frequently installed in inaccessible locations in the seat so that the coupling device cannot be disengaged directly at the actuating drive. In order to overcome this problem, Bowden cables or other mechanical devices, such as linkages, are generally used in order to bridge a relatively great distance between the actuating drive and an operating lever or an operating button.

In a known actuating drive, the coupling lever is always in contact with a coupling means. Since the coupling means rotates during motorized operation, this can lead to frictional losses, noise and abrasion.

In conventional solutions, return springs are arranged around a pull cable of a Bowden cable (30) in order to keep the pull cable under tensile force at all times and to return an actuating lever to its home position after manual actuation. Since the Bowden cable is generally not a component of the actuating drive, the return spring has to be mounted inconveniently by the user. This can also lead to assembly errors and operability can scarcely be checked in advance.

Bowden cables are subject to friction. The frictional force that must be overcome by a return spring is highly dependent on the seat geometry, the number of bends and their radii. In order to ensure a resetting of the actuating lever at all times, a simple adaptability of the spring action to the individual use case is required.

BRIEF SUMMARY OF THE INVENTION

The object of the invention is to ensure both reliable electrical and reliable manual operation, a high degree of efficiency during electrical operation, and simple assembly for a generic actuating drive. This object is achieved according to the invention. Since the coupling lever and the coupling means do not touch during electrical operation, friction-induced efficiency losses, noise emissions and abrasion particles cannot occur.

In order to ensure that the coupling means does not grind against the coupling lever, a return spring is provided which holds the coupling lever away from the coupling means.

The return spring is accommodated in the bearing block and is supported by it. As a result, the return spring is no longer arranged around a pull cable of a Bowden cable, as in conventional solutions. This frees a user from complicated assembly work. Frictional forces of the actuating unit can be compensated by the return spring. This is particularly important in the case of long Bowden cables, a large number of bends, and in particular in the case of bends with tight radii.

The bearing block has a projection which positively accommodates the return spring and holds it under pretension. The return spring is supported on the coupling lever and for this purpose is positively accommodated in a cavity, in particular in a receiving hole, or on a receiving pin. As a result, the return spring is simple to mount and is thereby held securely and reliably.

The spring travel of the return spring is expediently limited by a stop, wherein the stop is fastened to the bearing block or to a housing or is part of the bearing block or the housing.

It is conceivable for the bearing block to be mounted on the housing or to be part of the housing.

In order to ensure reliable transmission of force, the coupling device has a latching coupling. As a result, a positive connection in the rotational direction is provided in the engaged state.

The coupling lever has an oblique face as an actuating surface which, in the disengaged state of the coupling, is perpendicular to a crowned shaft end of the coupling mean (FIG. 1c). A selective rolling movement is thereby possible when the coupling lever is actuated manually. When manually actuated, a torque acts from the seat onto the gear, as a result of which the coupling means executes a rotational movement. In this situation, the oblique face, in an optimum design, touches the crowned shaft end at its center. The friction radius and thus the frictional resistance are thereby minimal and the seat can be adjusted reliably by hand.

The return spring must be able to overcome the friction of an actuating unit and move it back into the starting position.

In order to ensure a reliable resetting of the actuating unit in different use cases, it is proposed to adapt the spring properties of the return spring to the friction conditions of the application in question. The separate functionality between the return spring and the coupling engagement spring considerably facilitates this adaptation.

Compression springs and leg springs are particularly well-suited as return springs because they are simple to install.

A Bowden cable for manual actuation of the actuating arm and thus of the coupling lever is oriented substantially perpendicular or parallel to the direction of movement of the coupling means. In principle, however, other arrangements are also conceivable in which the Bowden cable is oriented at any angle to the coupling axis.

In the case of a Bowden cable oriented substantially perpendicular to the coupling axis, a leg spring is preferably used, and in the case of a Bowden cable oriented substantially parallel to the coupling axis, a compression spring is preferably used as a return spring.

In the case of aircraft seats, it is prescribed that the seat must be manually adjustable even in the event of failure of the power supply. In most cases it is therefore necessary for there to be no self-locking gear stages present between the electric motor and the actuator. A non-self-locking spindle is therefore used in linear drives.

In order for the seat to be held securely in its position in every seat position, a brake, in particular a friction brake, is therefore required which is actuated electromechanically during electrical operation (power-off brake)

BRIEF DESCRIPTION OF THE SEVERAL VIEWS OF THE DRAWINGS

The exemplary embodiments of the invention are explained in more detail below based on the drawing. The following is shown:

FIG. 2c shows the second embodiment in a third position, FIG. 2d shows the second embodiment in a fourth position.

Figure 1A:
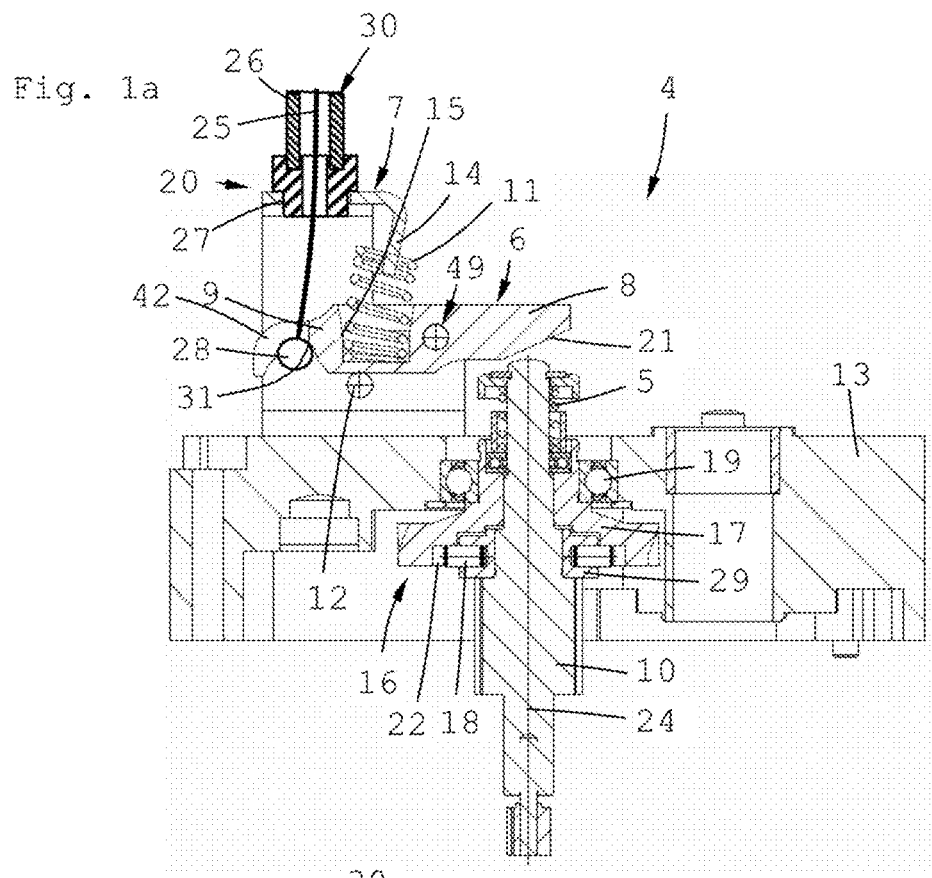
FIG. 1a shows a first embodiment of a coupling device of an actuating drive in a first position.

Note: The reference symbols with index and the corresponding reference symbols without index refer to details with the same name in the drawings and the drawing description. This reflects use in another embodiment or the prior art, and/or where the detail is a variant. For the sake of simplicity, the list of reference symbols contain only reference numbers without an index.

DETAILED DESCRIPTION OF THE INVENTION

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1a, FIG. 1b, FIG. 1c and FIG. 1d show a first embodiment of a coupling device 4 of an actuating drive in four different positions, with a housing 13, a coupling means 10 rotatably mounted about a coupling axis 24 in the housing 13 by a ball bearing 19, a coupling disc 17 and a Bowden cable 30. The coupling disc 17 is in geared engagement with a final gear stage (not shown here). The coupling means 10 is in geared connection with an electric motor via a plurality of gear stages and a friction brake.

The coupling means 10 carries a pressed-on ring 29 with radially pressed-in coupling pins 18 which engage positively in corresponding recesses 22 of the coupling disc 17. A coupling engagement spring 5 ensures stable positive locking between the coupling pins 18 and the recesses 22 during motorized operation.

The Bowden cable 30 has a bearing block 7 mounted on the housing 13, a coupling lever 6, a return spring 11, a pull cable 25, a sleeve 26 and a bushing 27. The Bowden cable 30 is routed from the actuating drive to an actuating lever on the seat (not shown here).

The coupling lever 6 consists of a coupling arm 8 and an actuating arm 9 and is pivotably mounted in the bearing block 7, wherein the return spring 11 for the Bowden cable 30 is positively accommodated between an angled projection 14 of the bearing block 7 and a cavity 15 of the coupling lever 6. For ease of assembly, the cavity is provided with an insertion chamfer.

The pull cable 25 of the Bowden cable 30 terminates with a barrel nipple 28 which is suspended in a spring-loaded manner through a slot 42 in a receiver 31 of the actuating arm 9. The coupling lever 6 is pivotably mounted about a pivot bearing 49 of the bearing block 7 and has an oblique face 21 on the coupling arm 8 which serves as an actuating surface and interacts with a crowned end of the coupling means 10 during manual operation.

FIG. 1a shows the first embodiment of the coupling device 4 in a first position in which a Bowden cable 30 is not actuated. In this case, the coupling pins 18 of the coupling means 10 engage positively in the recesses 22 of the coupling disc 17 and can transmit a torque. The coupling engagement spring 5 maintains this state.

Figure 1B:
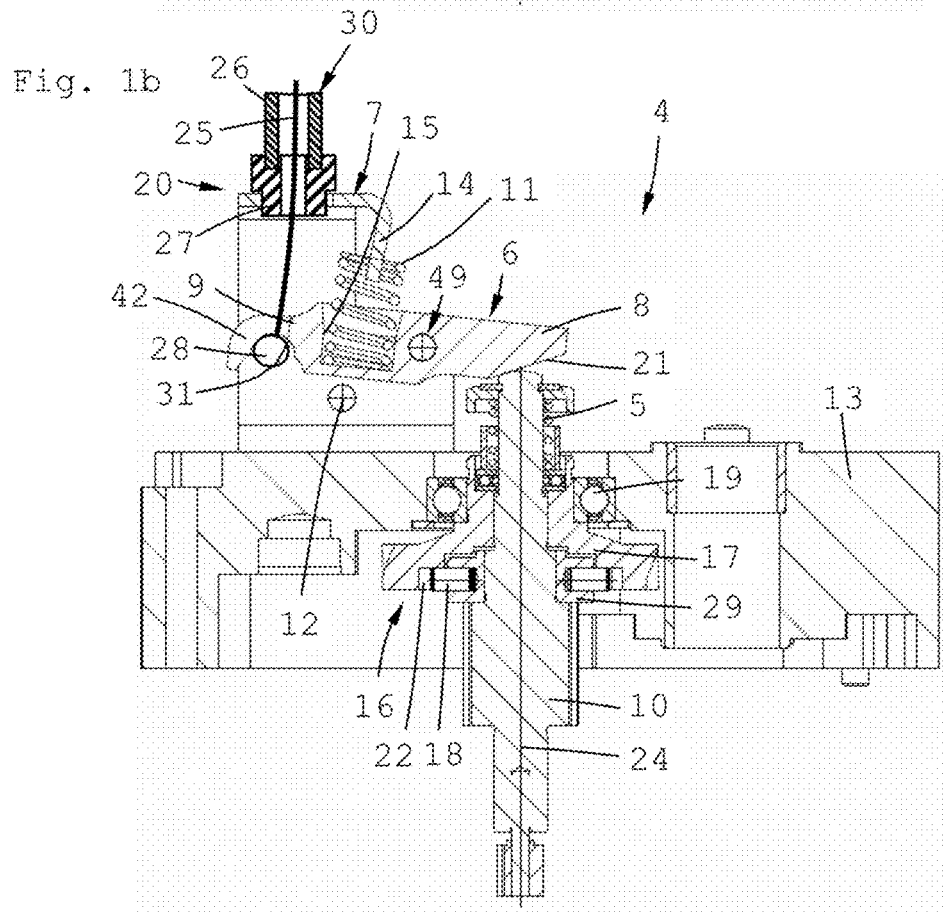
FIG. 1b shows the first embodiment in a second position.

FIG. 1b shows the first embodiment of the coupling device 4 in a second position in which the coupling lever 6 touches the coupling means 10 at its end, but the coupling pins 18 of the coupling means are still positively engaged in the recesses 22 of the coupling disc 17.

Figure 1C:
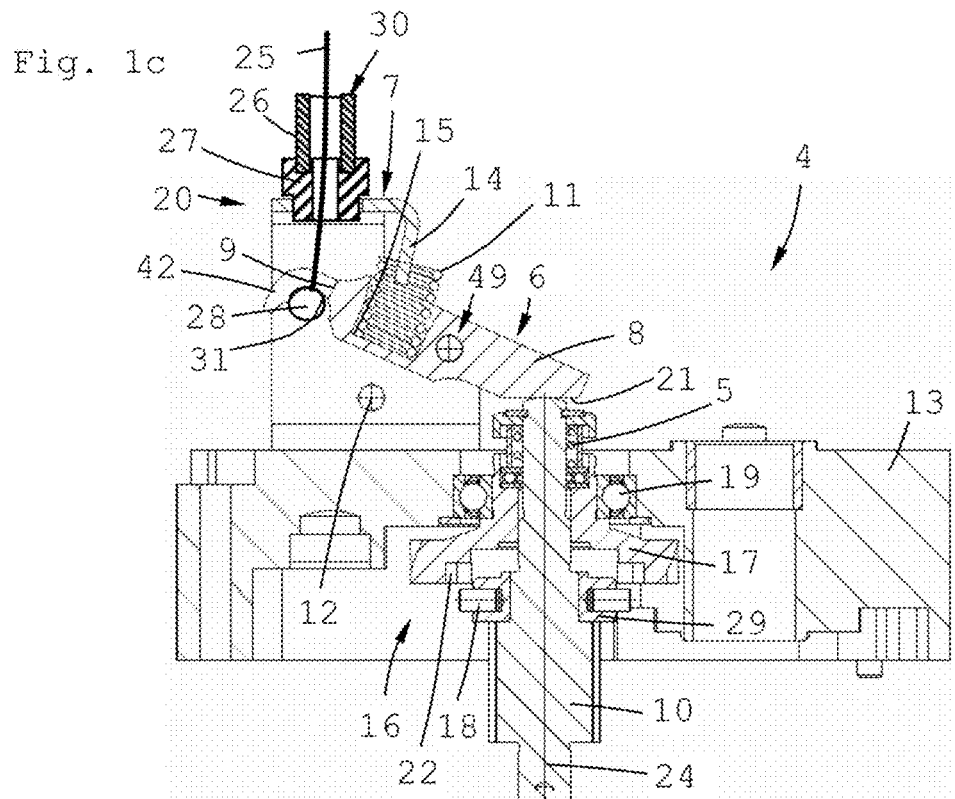
FIG. 1c shows the first embodiment in a third position.

FIG. 1c shows the first embodiment of the coupling device in a third position in which the coupling lever 6 has shifted the coupling means 10 to the maximum against the force of the coupling engagement spring 5 so that the coupling pins 18 of the coupling means 10 are disengaged from the recesses 22 of the coupling disc 17. The flow of force from the electric motor 3 with the electromechanical brake (power-off brake) to the actuator is thus interrupted and a manual adjustment of the seat is possible.

Figure 1D:
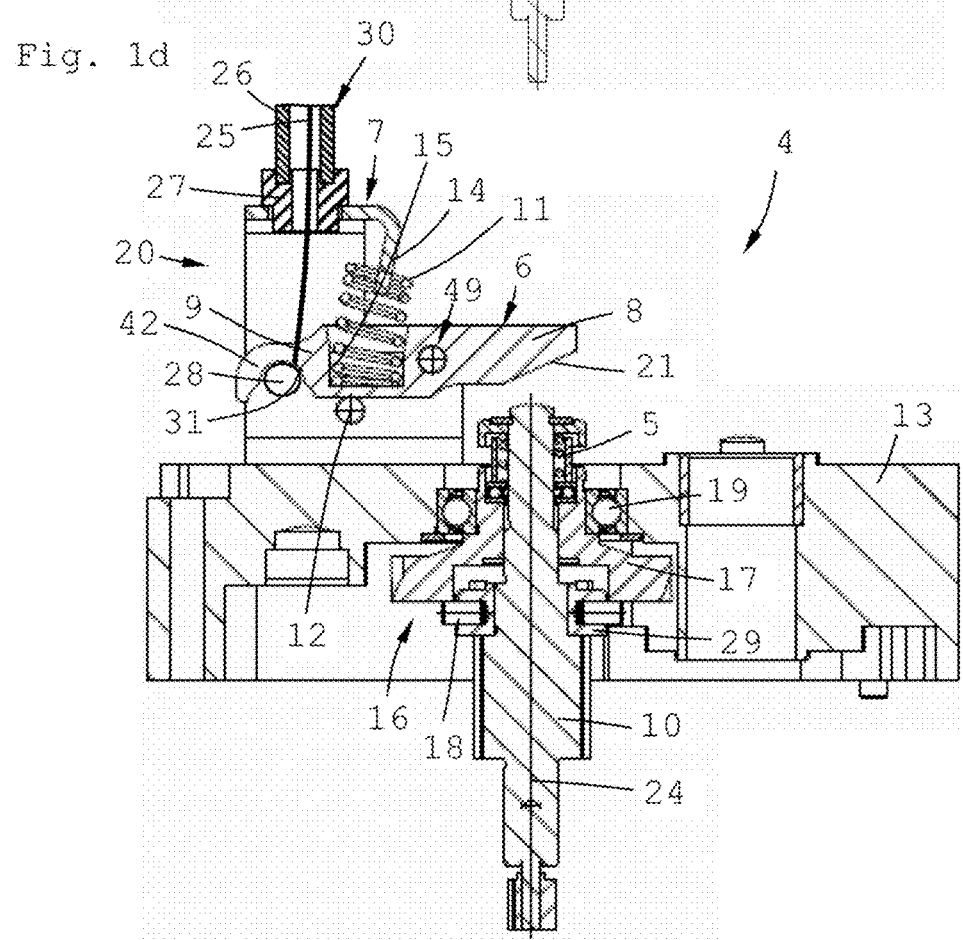
FIG. 1d shows the first embodiment in a fourth position.

FIG. 1d shows the first embodiment of the coupling device 4 in a fourth position in which the coupling lever 6 is held back again in its starting position by the return spring 11 but the coupling pins 18 lie on the coupling disc 17 in an angular position between the recesses 22, whereby the coupling engagement spring 5 remains tensioned. In the case of a following electrical or manual adjustment, the coupling pins 18 would again latch into the recesses 22 and transmit a torque under the action of the coupling engagement spring 5.

FIG. 2a, FIG. 2b, FIG. 2c and FIG. 2d show a second embodiment of a coupling device 4 of an actuating drive in four different positions, with a housing 13a, a coupling means 10a rotatably mounted about a coupling axis 24a in the housing 13a by a ball bearing 19a, a coupling disc 17a and a Bowden cable 30a. The coupling disc 17a is in geared engagement with a final gear stage (not shown here). The coupling means 10a is in geared connection with an electric motor via a plurality of gear stages (not shown here).

The coupling means 10a carries a pressed-on ring 29a with radially pressed-in coupling pins 18a which engage positively in corresponding recesses 22a of the coupling disc 17a. A coupling engagement spring 5a ensures stable positive locking between the coupling pins 18a and the recesses 22a during motorized operation.

The Bowden cable 30a has a bearing block 7a mounted on the housing 13a, a coupling lever 6a, a return spring 11a, a pull cable 25a, a sleeve 26a and a bushing 27a. The coupling lever 6a consists of a coupling arm 8a, an actuating arm 9a and two side parts 58a angled away from a center piece 57a. The pivot bearing 49 is arranged in the side parts 58a. The coupling arm 8a is angled away from the center piece 57a and has a Z-shaped shape. The actuating arm 9a is angled away from the center piece 57a and has an L-shaped shape. The Bowden cable 30a is routed from the actuating drive to an actuating lever on the seat (not shown here). The bushing 27a of the Bowden cable 30a is supported on a separate angled plate 32a which is fastened to the housing 13 by screws. The return spring 11a here takes the form of a leg spring which is arranged around a pivot pin of a pivot bearing 49a, wherein a retaining leg 33a of the leg spring is held on an angled retaining portion 50 of the bearing block 7a and an actuating leg 34a contacts the coupling lever 6a via the center piece 57a. The coupling lever 6a is pivotably mounted in the bearing block 7a, consists of a punched and bent part, is multiply angled and is supported on a stop 12 mounted in the bearing block 7a.

The pull cable 25a of the Bowden cable 30a terminates with a barrel nipple 28a which is suspended in a spring-loaded manner on the actuating arm 9a.

Figure 2A:
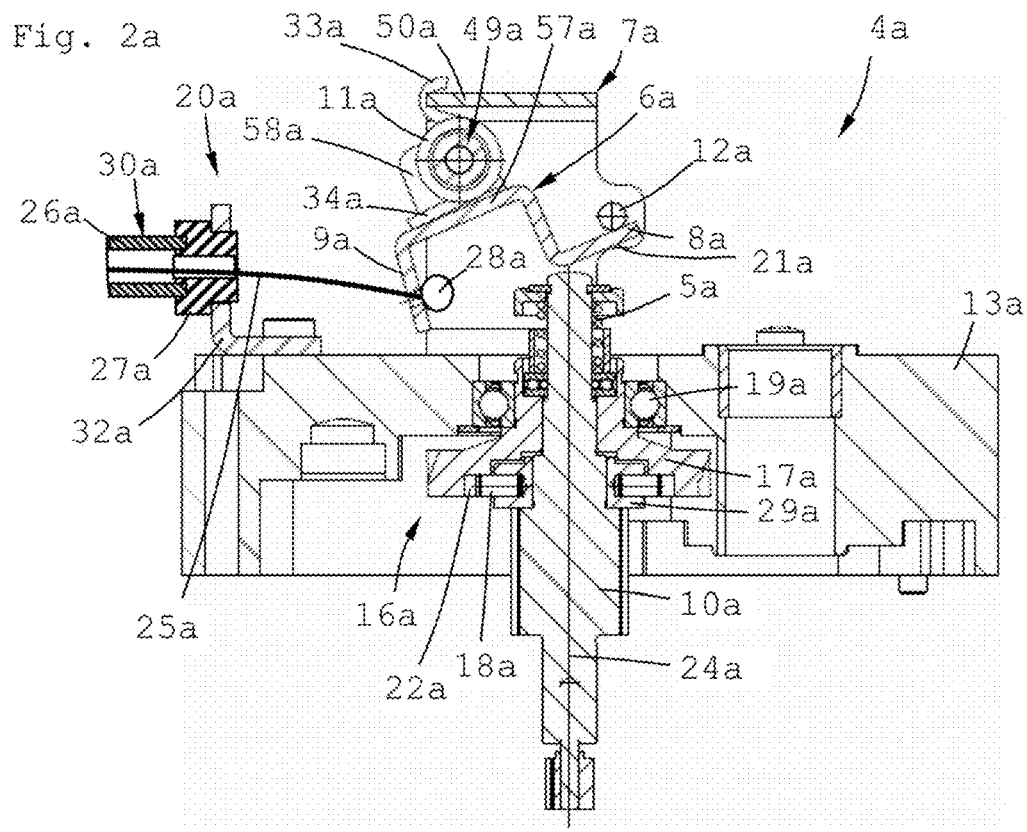
FIG. 2a shows a second embodiment of a coupling device of an actuating drive in a first position.

FIG. 2a shows the second embodiment of the coupling device 4a in a first position in which a Bowden cable 30a is not actuated. In this case, the coupling pins 18a of the coupling means 10a are positively engaged in the recesses 22a of the coupling disc 17a and can transmit a torque. The coupling engagement spring 5a maintains this state.

Figure 2B:
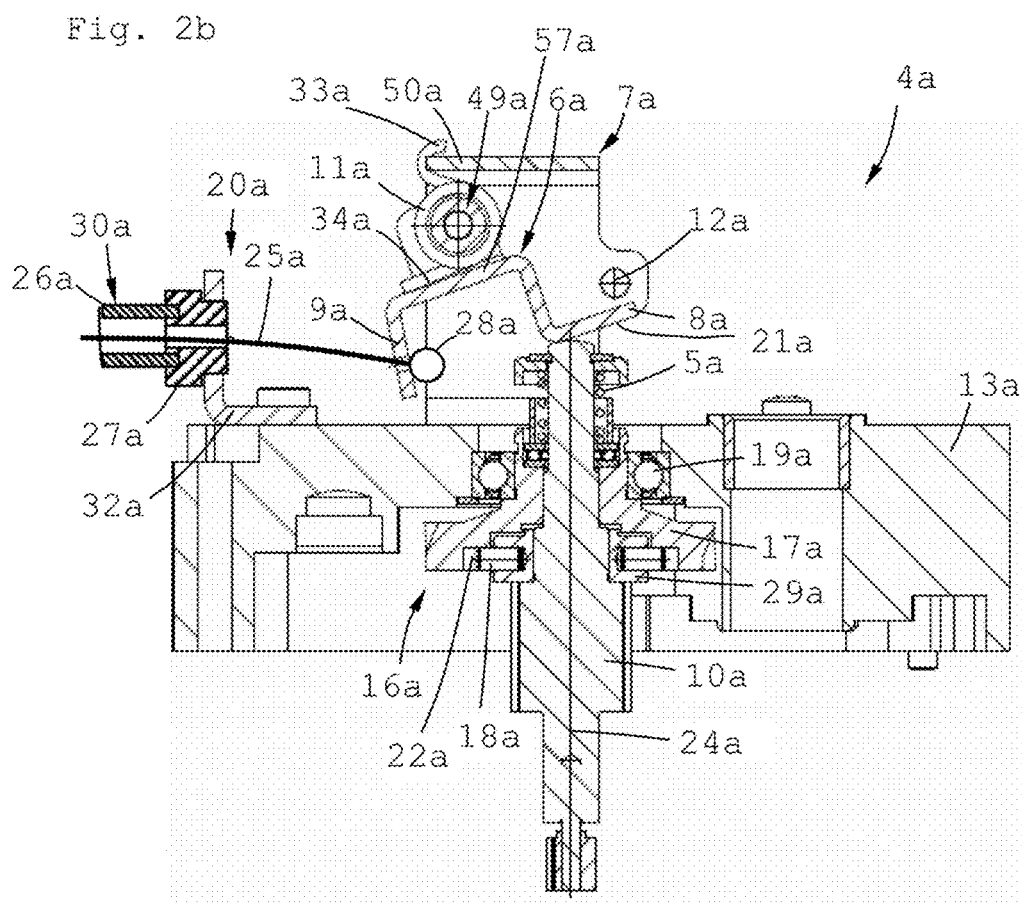
FIG. 2b shows the second embodiment in a second position.

FIG. 2b shows the second embodiment of the coupling device 4a in a second position in which the coupling lever 6a touches the coupling means 10a at its end, but the coupling pins 18a of the coupling means are still positively engaged in the recesses 22a of the coupling disc 17a.

FIG. 2c shows the second embodiment of the coupling device in a third position in which the coupling lever 6a has shifted the coupling means 10a to the maximum against the force of the coupling engagement spring 5a so that the coupling pins 18a of the coupling means 10a are disengaged from the recesses 22a of the coupling plate 17a. The flow of force from the electric motor 3 with the electromechanical brake (power-off brake) to the actuator is thus interrupted and a manual adjustment of the seat is possible.

FIG. 2d shows the second embodiment of the coupling device 4a in a fourth position in which the coupling lever 6a is held back again in its starting position by the return spring 11a but the coupling pins 18a lie on the coupling disc 17a in an angular position between the recesses 22a, whereby the coupling engagement spring 5a remains tensioned. In the case of a following electrical or manual adjustment, the coupling pins 18a would again latch into the recesses 22a and transmit a torque under the action of the coupling engagement spring 5a.

Figure 3A:
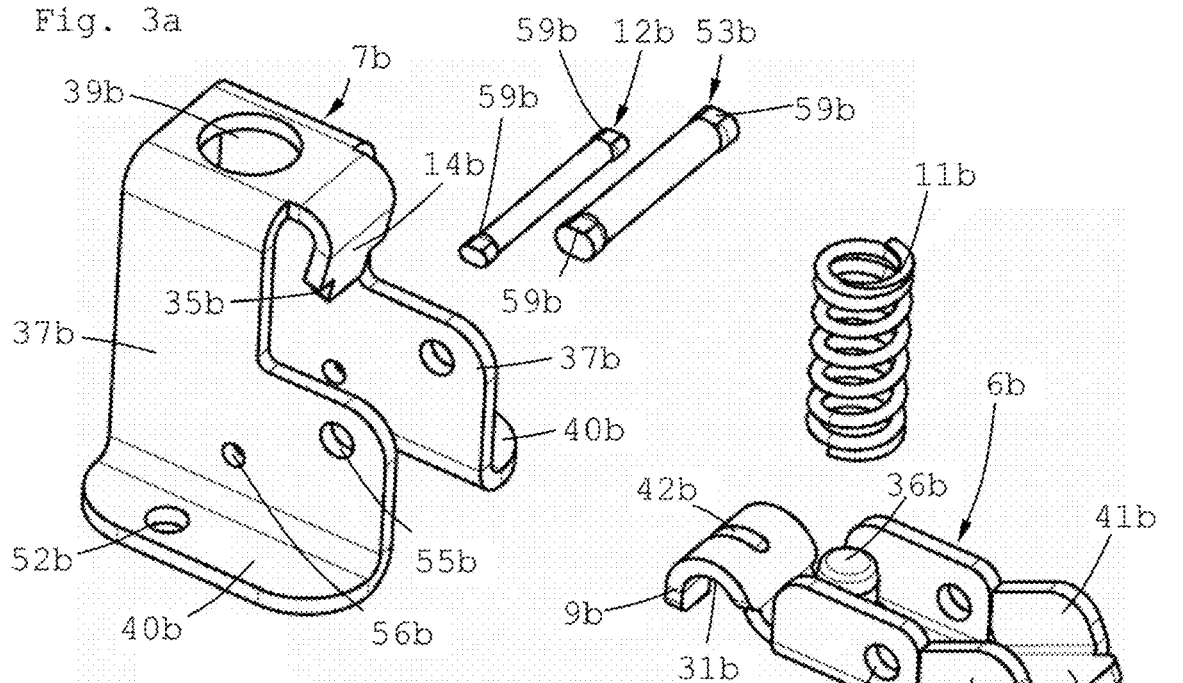
FIG. 3a is an exploded view of a third embodiment of a coupling device of an actuating drive.

FIG. 3a shows an exploded view of a third embodiment of a coupling device of an actuating drive, with a bearing block 7b, a coupling lever 6b, a return spring 11b in the form of a compression spring, a pivot pin 53b and a stop 12b. Pivot pin receivers 55b and stop pin receivers 56b are provided in the bearing block 7b for receiving the pivot pin 53b and the stop 12b. Pivot pin through-holes 23b for receiving the pivot pin 53b are formed in the pivot lever 6b. In FIG. 3a the pivot pin and the stop 12b are shown with press-fit stemmed ends; however, during assembly at least the press-fit stemming 59b at one end is produced only after these components have been assembled in the bearing block 7a. The bearing block 7b has an L-shaped, angled projection 14b which is provided with two notches 35b. These serve as support points for the return spring 11b. Fastened in the coupling lever 6a is a receiving pin 36b (riveted here) which represents a guide for the return spring 11b. For ease of assembly, the receiving pin is provided with a distinct chamfer. For this purpose, the receiving pin 36b has a rivet pin 54b which is positively connected to the coupling lever 6b. The annular region 51b extending around the receiving pin 36b (see FIG. 3b) of the coupling lever 6b forms a support for the return spring 11b. The coupling lever 6b consists of an actuating arm 9b and a coupling arm 8b. The coupling arm has an oblique face 21b which serves as an actuating surface for a coupling means 10. The actuating arm 9b at its end takes the form of a receiver 31b for a barrel nipple at the end of a pull cable 25. The receiver 31b is provided with a slot 42b which is open toward its end and serves to facilitate assembly of the pull cable. The bearing block 7b has two side cheeks 37b which are connected by a yoke 38b. A leadthrough 39b for a Bowden cable is present in the yoke 38b. A support 40b is angled away on each of the side cheeks 37b. The supports 40b are provided as contact faces on a housing 13.

Figure 3B:
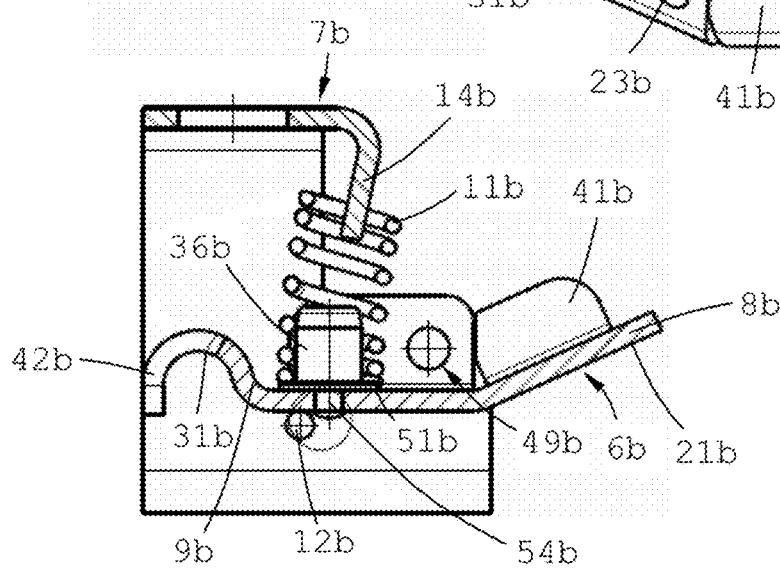
FIG. 3b is a sectional view of the third embodiment.

FIG. 3b shows a sectional view of the third embodiment, with the bearing block 7b, the projection 14b, the return spring 11b, the receiving pin 36b, and the coupling lever 6b with the receiver 31b on the actuating arm 9b and the coupling arm 8b and with the oblique face 21b. The coupling lever 6a is stiffened by stiffening cheeks 41b.

Figure 3C:
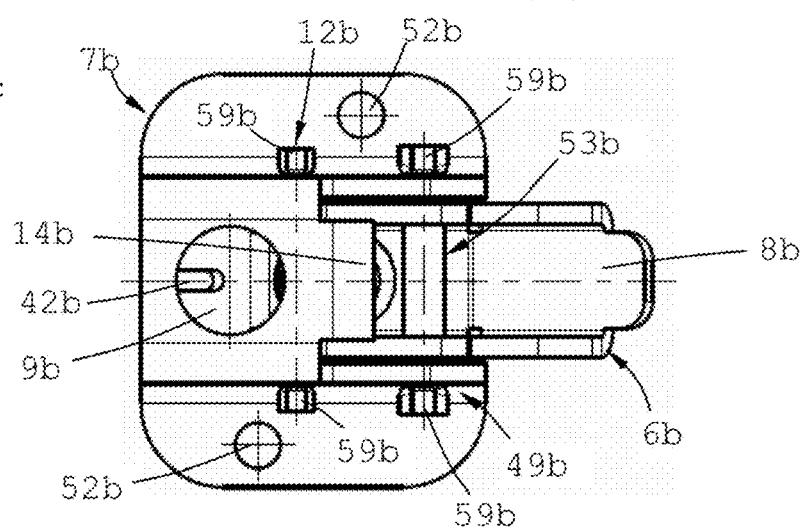
FIG. 3c is a top view of the third embodiment.

FIG. 3c shows a top view of the third embodiment, with the bearing block 7b, the projection 14b, the coupling lever 6b, the pivot bearing 49b (formed by pivot pin 53b, pivot pin receiver on the bearing block 7b and pivot pin through-hole in the coupling lever 6b) and the stop 12b. The coupling lever 6b has the coupling arm 8b, the actuating arm 9b and the slot 42b. Screw-mounting through-holes 52b are present in the supports 40b.

Figure 4:
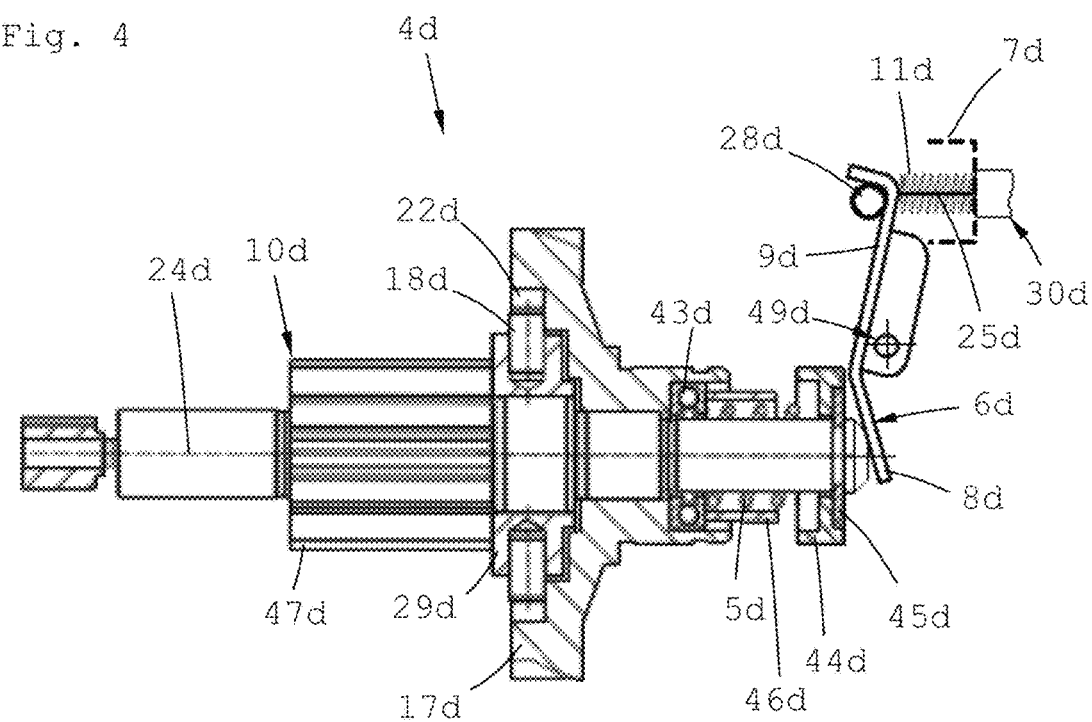
FIG. 4 shows a coupling device of an actuating drive according to the prior art.

FIG. 4 shows a coupling device 4d of an actuating drive according to the prior art, with a coupling means 10d rotatable about a coupling axis 24d, a coupling disc 17d, a bearing block 7d (indicated here), a Bowden cable 30d and a coupling lever 6d. The coupling means 10d has a toothing 47d and a pressed-on ring 29d with radially pressed-in coupling pins 18d which engage in recesses 22d of the coupling disc 17d. The toothing 47d is dimensioned such that upon axial movement of the coupling means 10d, a gear wheel (not shown) engaged therewith remains engaged in each coupling position. Furthermore, a coupling engagement spring 5d is arranged on the coupling means 10d between an axial ball bearing 43d and a retaining ring 44d, wherein the retaining ring 44d is held by a locking washer 45d. A sleeve 46d is arranged around the coupling engagement spring 5d and is likewise supported on the axial ball bearing 43d and serves as a stop for the retaining ring 44d when the coupling device 4d is actuated. The coupling lever 6d is pivotable about a pivot bearing 49d and consists of an actuating arm 9d and a coupling arm 8d. The pivot bearing 49d is a component of the bearing block 7d. A pull cable 25d of the Bowden cable 30d is routed through the return spring 11d. The return spring 11d is arranged between the bearing block 7d (dashed line) and the operating arm 9d. The end of the pull cable 25d is provided with a barrel nipple 28d abutting the actuating arm 9d. A significant disadvantage of this known coupling device is that, due to the installation position of the return spring 11d, this cannot be integrated into a compact actuating drive. It must therefore be mounted by the user.

Figure 5:
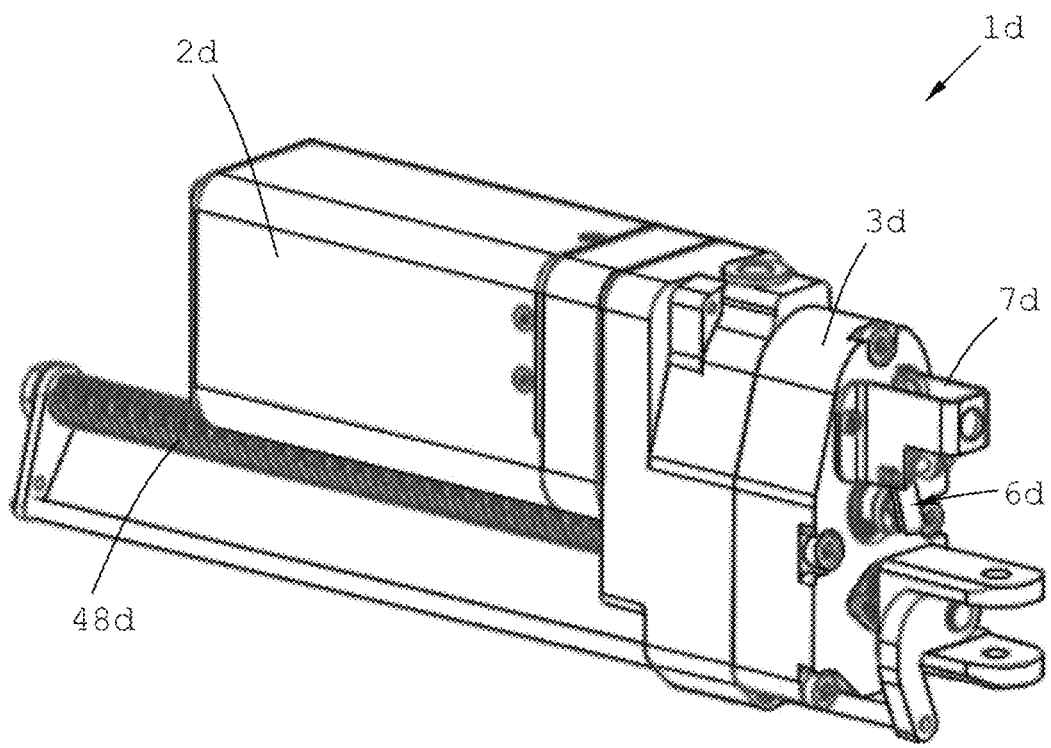
FIG. 5 shows an actuating drive with a coupling device according to the prior art.

FIG. 5 shows an actuating drive 1d with a coupling device 4 concealed in the housing 3d, a bearing block 7d, a coupling lever 6d and a non-self locking spindle 48d. An electromechanical brake is arranged between the electric motor (2) and the reduction gear (3).

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE SYMBOLS

1 Actuating drive
2 Electric motor with electromechanical brake
3 Reduction gear
4 Coupling device
5 Coupling engagement spring
6 Coupling lever
7 Bearing block
8 Coupling arm
9 Actuating arm
10 Coupling means
11 Return spring
12 Stop
13 Housing
14 Projection
15 Cavity
16 Latching coupling
17 Coupling disc
18 Coupling pin
19 Ball bearing
20 Actuating unit
21 Oblique face
22 Recess
23 Pivot pin through-hole
24 Coupling axis
25 Pull cable
26 Sleeve
27 Bushing
28 Barrel nipple
29 Ring
30 Bowden cable
31 Receiver
32 Angled plate
33 Retaining leg
34 Actuating leg
35 Notch
36 Receiving pin
37 Side cheek
38 Yoke
39 Leadthrough
40 Support
41 Stiffening cheek
42 Slot
43 Axial ball bearing
44 Retaining ring
45 Locking washer
46 Sleeve
47 Toothing
48 Spindle
49 Pivot bearing
50 Retaining portion
51 Annular region
52 Screw-mounting through-hole
53 Pivot pin
54 Rivet pin
55 Pivot pin receiver
56 Stop pin receiver
57 Center piece
58 Side part
59 Press-fit stemming

What is claimed is:

1. Actuating drive for seat adjustment devices, the actuating drive comprising:
    at least one electric motor capable of motorized operation;
    a mechanical actuating unit;
    a reduction gear positioned downstream of the at least one electric motor;
    a coupling device with a housing and having a coupling engagement spring which ensures an engaged position of the coupling device during motorized operation of the at least one electric motor and permits a manual disengagement against the coupling force of the coupling device;
    a bearing block with a pivot bearing, wherein the coupling device has a coupling lever pivotably mounted in the pivot bearing of the bearing block; and
    a coupling means for engaging and disengaging the coupling device;
    the coupling lever being connected on one side of the pivot bearing to the mechanical actuating unit and by which on the other side of the pivot bearing the coupling means can be adjusted to disengage the coupling device, wherein the coupling lever and the coupling means do not touch each other during motorized operation.

2. The actuating drive according to claim 1, wherein the coupling lever is held away from the coupling means by a return spring during motorized operation or during the idle state of the at least one electric motor.

3. The actuating drive according to claim 2, wherein the return spring is accommodated in the bearing block and is supported by it.

4. The actuating drive according to claim 3, wherein the bearing block has a projection which keeps the return spring under pretension.

5. The actuating drive according to claim 3, wherein the return spring is supported on the coupling lever and is positively accommodated in a cavity, in the form of a receiving hole, or on a receiving pin.

6. The actuating drive according to claim 2, wherein the spring travel of the return spring is limited by a stop, wherein the stop is fastened to the bearing block or is part of the bearing block.

7. The actuating drive according to claim 2, wherein the spring travel of the return spring is limited by a stop, wherein the stop is fastened to the housing or is part of the housing.

8. Actuating drive according to claim 1 wherein the bearing block is mounted on the housing or is part of the housing.

9. Actuating drive according to claim 1 wherein the coupling device has a latching coupling.

10. Actuating drive according to claim 1 wherein the coupling lever has an actuating face which, in the disengaged state of the coupling, is perpendicular to a crowned shaft end of the coupling means.

11. Actuating drive according to claim 1 wherein the return spring is able to overcome the friction of the mechanical actuating unit and move it back into a starting position.

12. Actuating drive according to claim 1 wherein the return spring enables a variable restoring force of the mechanical actuating unit with different spring rates.

13. Actuating drive according to claim 1 wherein the return spring is a compression spring.

14. Actuating drive according to claim 1 wherein the return spring is a leg spring.

15. Actuating drive according to claim 1 further comprising a coupling axis in the housing and a Bowden cable, wherein the Bowden cable is oriented substantially perpendicular or parallel to a direction of movement or the coupling axis.

16. Actuating drive according to claim 15 wherein a leg spring is used when the Bowden cable is oriented substantially perpendicular to the coupling axis.

17. Actuating drive according to claim 15 wherein a compression spring is used when the Bowden cable is oriented substantially parallel to the coupling axis.

18. Actuating drive according to claim 1 further comprising a non-self-locking end stage in the form of a non-self-locking spindle.

19. Actuating drive according to claim 1 wherein an electromechanical brake is arranged between the electric motor and the reduction gear.

* * * * *